United States Patent
Ono et al.

(10) Patent No.: US 9,604,329 B2
(45) Date of Patent: Mar. 28, 2017

(54) TIGHTENING SYSTEM

(75) Inventors: Akio Ono, Okazaki (JP); Seizo Fukumoto, Nara (JP)

(73) Assignees: TOYOTA JIDOSHA KABUSHIKI KAISHA, Toyota (JP); GIKEN INDUSTRIAL CO., LTD., Yamatokoriyama-shi (JP)

( * ) Notice: Subject to any disclaimer, the term of this patent is extended or adjusted under 35 U.S.C. 154(b) by 535 days.

(21) Appl. No.: 14/240,061

(22) PCT Filed: Aug. 22, 2012

(86) PCT No.: PCT/IB2012/001955
§ 371 (c)(1),
(2), (4) Date: Feb. 21, 2014

(87) PCT Pub. No.: WO2013/027122
PCT Pub. Date: Feb. 28, 2013

(65) Prior Publication Data
US 2014/0190314 A1   Jul. 10, 2014

(30) Foreign Application Priority Data

Aug. 24, 2011 (JP) .................................. 2011-183085

(51) Int. Cl.
*B23P 19/06* (2006.01)

(52) U.S. Cl.
CPC .................................... *B23P 19/06* (2013.01)

(58) Field of Classification Search
CPC .................................. B23P 19/06; B25B 23/14
USPC .......................................................... 81/57.4
See application file for complete search history.

(56) References Cited

U.S. PATENT DOCUMENTS

| | | | | |
|---|---|---|---|---|
| 2,263,709 | A * | 11/1941 | Van Sittert ............ | B25B 23/141 |
| | | | | 192/56.1 |
| 3,869,942 | A * | 3/1975 | DeCaro ............... | B25B 23/0064 |
| | | | | 81/429 |
| 5,408,903 | A * | 4/1995 | Ramin .................... | B25B 21/00 |
| | | | | 81/433 |
| 7,487,698 | B2 * | 2/2009 | Noguchi ................ | B23P 19/06 |
| | | | | 81/451 |
| 2014/0076078 | A1 * | 3/2014 | Vollmuth ................ | B23P 19/06 |
| | | | | 74/22 R |

FOREIGN PATENT DOCUMENTS

| | | |
|---|---|---|
| JP | A 8-11027 | 1/1996 |
| JP | A 9-254044 | 9/1997 |
| JP | A 2005-131741 | 5/2005 |

* cited by examiner

*Primary Examiner* — Hadi Shakeri
(74) *Attorney, Agent, or Firm* — Oliff PLC

(57) ABSTRACT

A tightening system for tightening a fastening member includes: a driving section producing torque for tightening the fastening member; an extension bar coupled to the driving section and rotating by the torque; a spindle to which the torque is transmitted via the extension bar and which is connected to the extension bar such that the spindle moves forward or backward in a rotational axis direction of the extension bar with respect to the extension bar; a socket provided at a tip of the spindle and engages in the fastening member; a spindle case housing the spindle and helically spline-engaging with the spindle along a rotational axis direction of the spindle; an outer case housing the spindle case; and a switch for switching between held and separated states between the spindle case and the outer case.

1 Claim, 5 Drawing Sheets

TIGHTENING SYSTEM

BACKGROUND OF THE INVENTION

1. Field of the Invention

The present invention relates to a tightening system for tightening fastening members such as screws.

2. Description of Related Art

Conventionally, tightening systems (also referred to as "nut runners") for tightening screws such as bolts and nuts have been used, for example, in assembly lines of automobile engines (see Japanese Patent Application Publication No. 8-11027 (JP 8-11027 A)).

Such a tightening system described above includes a drive source such as a motor, a spindle coupled to a rotational shaft of the drive source, a socket provided at a tip of the spindle, and so forth. The socket is engaged with a screw and rotated by the drive source, thus tightening the screw. Among the tightening systems, there is a system such as the tightening system disclosed in JP 8-11027 A in which the spindle is configured to be vertically moveable with respect to a workpiece. In the tightening system, when tightening a screw, the spindle having the socket moves down to the tightening positions, and moves up from the workpiece after the tightening is complete. In other words, the tightening system includes socket vertically moving means for moving the socket at the tip of the spindle up or down with respect to the workpiece by vertically moving the spindle.

A type described below has been known as one type of the socket vertically moving means. For example, in a case that the socket is positioned in the rotational axis direction of the spindle, the spindle is configured to be slidable in the rotational axis direction, and an actuator for moving the spindle allows the spindle to move forward or backward in the rotational axis direction, thereby carrying out the vertical motion of the socket at the tip of the spindle.

Figure 5:
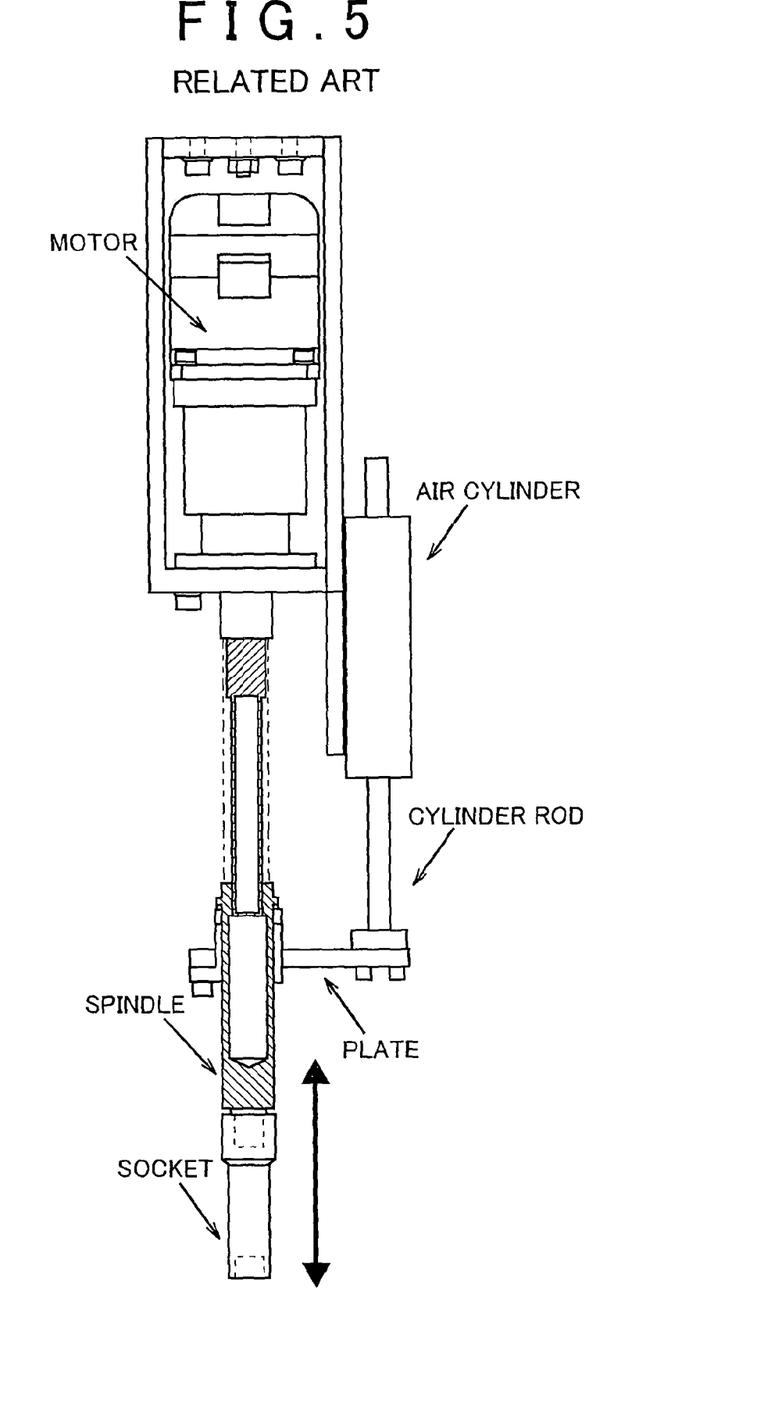
FIG. 5 is a partial cross-sectional side view showing a conventional tightening system.

For example, as shown in FIG. 5, a system has been known in which a general-purpose air cylinder as the actuator is externally attached adjacent to the spindle, the spindle and a cylinder rod end of the air cylinder are coupled together by a plate, and the air cylinder extends and contracts via the plate to allow the spindle to move forward or backward, thereby vertically moving the spindle and the socket.

However, such a conventional tightening system described above uses a bulky actuator such as the air cylinder as the vertically moving means of the socket and thus becomes a large system having the actuator externally attached adjacent to a system main body. Further, when the tightening system (nut runner) becomes large as in this case, the tightening systems including a plurality of nut runners (multi-axis nut runner) may impair tightening efficiency due to the increase in interference areas among the nut runners. Accordingly, a tightening system in a further compact system configuration is desired.

SUMMARY OF THE INVENTION

Accordingly, the present invention provides a tightening system in a compact configuration for tightening a fastening member.

A tightening system for tightening a fastening member in accordance with an aspect of the present invention, the system includes: a driving section which produces torque for tightening the fastening member; an extension bar which is coupled to the driving section and rotated by the torque; a spindle to which the torque is transmitted via the extension bar and which is connected to the extension bar such that the spindle moves forward or backward in a rotational axis direction, of the extension bar with respect to the extension bar; a socket which is provided at a tip of the spindle and engages in the fastening member; a spindle case which houses the spindle and makes helical spline engagement with the spindle along a rotational axis direction of the spindle; an outer case which houses the spindle case; and a switch for switching between a state where the spindle case is held by the outer case and a state where the spindle case is separated from the outer case.

In the aspect, the switch is an electromagnetic clutch which is integrally mounted in the outer case, i) when the electromagnetic clutch is electrically connected, the spindle case is held by the outer case, and when the spindle is rotated by drive of the driving section, the spindle moves forward or backward with respect to the spindle case, ii) when the electromagnetic clutch is electrically disconnected, the spindle case is separated from the outer case, and when the spindle is rotated by the drive of the driving section, the spindle case corotates with the spindle and the fastening member which is engaged in the socket is tightened.

According to the aspect of the present invention, the tightening system is capable of forward-backward motion of the spindle by use of the rotation of the driving section and allows a compact system configuration.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 4A, 4B, and 4C are explanatory views showing vertical motion of a spindle, in which FIG. 4A shows a state where the spindle is positioned at an upper end position, FIG. 4B shows a state where the spindle is positioned in an intermediate position, and FIG. 4C shows a state where the spindle is at a lower end position.

DETAILED DESCRIPTION OF EMBODIMENTS

An embodiment of the present invention will next be described. First, a tightening system 30 as an embodiment of the present invention will be described with reference to FIGS. 1, 2, and 3.

Figure 1:
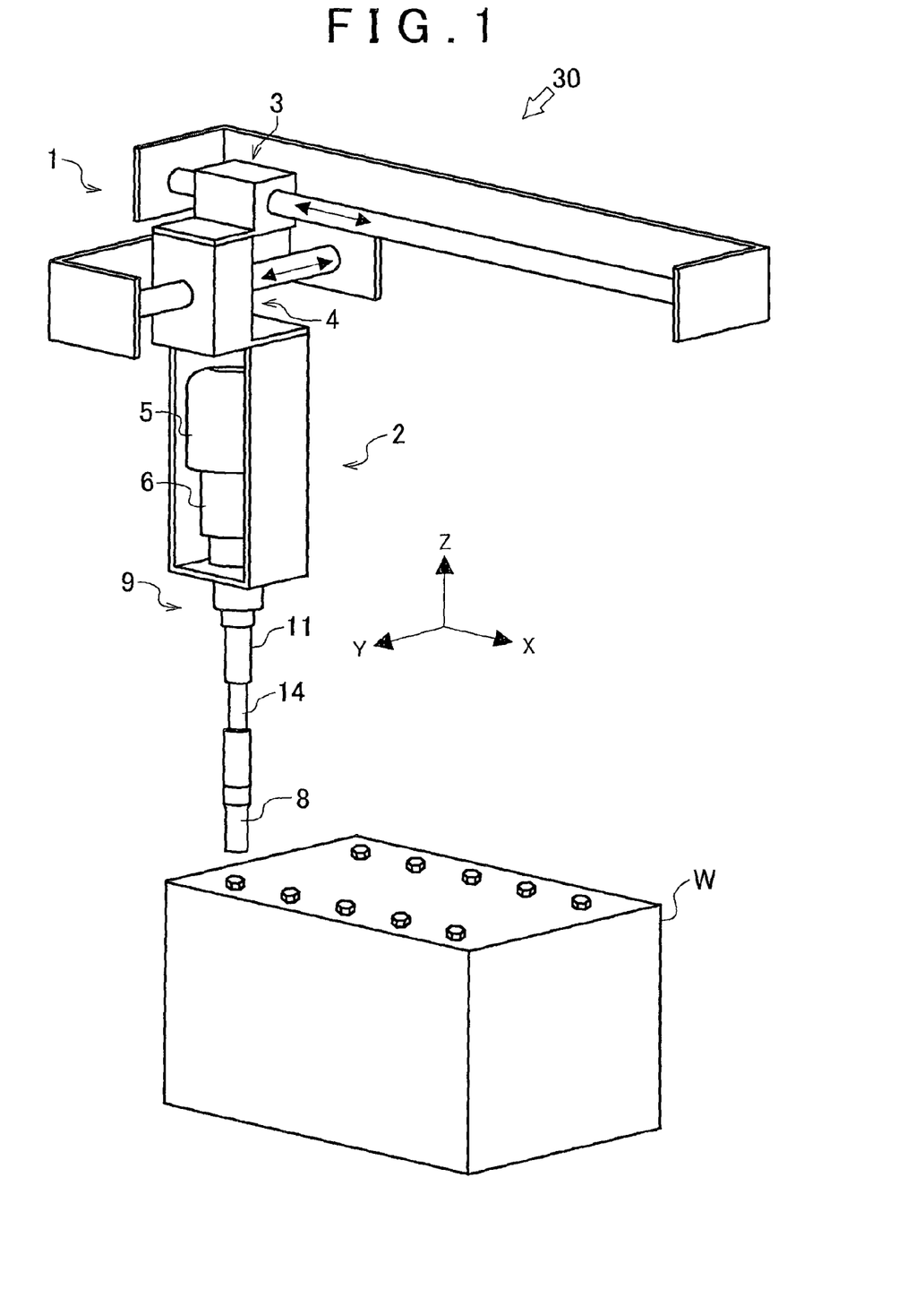
FIG. 1 is a perspective view schematically showing a configuration of a tightening system in accordance with the embodiment of the present invention.

The tightening system 30 is a system for tightening fastening members on a workpiece W and is used, for example, when tightening the fastening members (screws such as bolts and nuts in this embodiment) for fastening a cylinder block and a cylinder head of an engine that are workpieces W together in an assembly line of automobile engines. As shown in FIG. 1, the tightening system 30 includes a nut runner variably positioning section 1, a nut runner 2, and so forth, and a control section (not shown) for controlling motion of those. For the convenience of description, X, Y, and Z-axis directions shown in FIG. 1 are the X, Y, and Z-axis directions in this embodiment. A rotational axis direction in this embodiment means the rotational axis directions of a motor 5, an extension bar 7, a spindle 14, and a socket 8, which will be described later, and is the Z-axis direction in FIG. 1.

The nut runner variably positioning section 1 is configured with a Cartesian coordinate robot 3 which is an X-axis positioning device for positioning the nut runner 2 in a variable position and a Cartesian coordinate robot 4 which is a Y-axis positioning device that support the single nut runner 2 suspended down therefrom. In other words, the nut runner variably positioning section 1 is configured as a two-axis Cartesian coordinate robot that variably moves the nut runner in the two axes that are the X and Y-axes. As described above, the nut runner variably positioning section 1 appropriately changes the position of the nut runner 2 in the independent two axes that are the X and Y-axes by the Cartesian coordinate robots 3 and 4. That is, the Cartesian coordinate robots 3 and 4 change the position in the X and Y-axis directions of the socket 8 provided at the tip of the nut runner 2. The motions of the Cartesian coordinate robots 3 and 4 are controlled by the control section to which the robots are connected via wires or the like.

Figure 2:
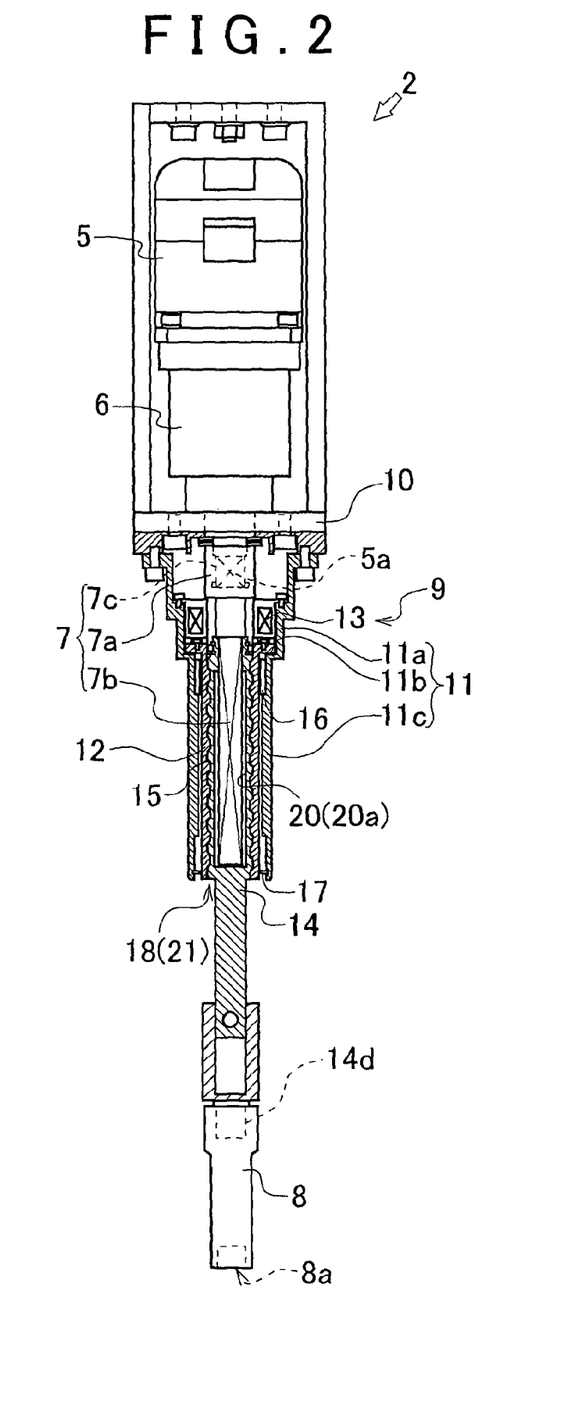
FIG. 2 is a partial cross-sectional side view showing a nut runner.

The nut runner 2 is a main body of the tightening system 30 which rotates and tightens the fastening members on the workpiece W, and as shown in FIG. 2, mainly has the motor 5, a torque transducer 6, the extension bar 7, the socket 8, a socket vertically moving section 9, and so forth. The nut runner 2 is supported below the lower portion of the nut runner variably positioning section 1.

The motor 5 is a driving section which produces driving rotational force for rotating the socket 8 and provides torque for tightening the fastening member in which the socket 8 is engaged. The motor 5 has a main shaft 5*a* as an output shaft. The motor 5 is supported by and fixed to a base plate 10. The extension bar 7 is coupled to the main shaft 5*a* of the motor 5. The operation of the motor 5 is controlled by the control section to which the motor 5 is connected via wires or the like. In other words, the control section controls the tightening (tightening amount, rotational direction, tightening torque, and the like) by the nut runner 2. The torque transducer 6 is mounted on the motor 5.

The torque transducer 6 is a torque sensor which detects the torque during the rotation of the motor 5. The torque transducer 6 is connected to the control section via wires or the like. The torque transducer 6 detects the torque during the rotation of the motor 5 and outputs the detected torque to the control section.

Figure 3:
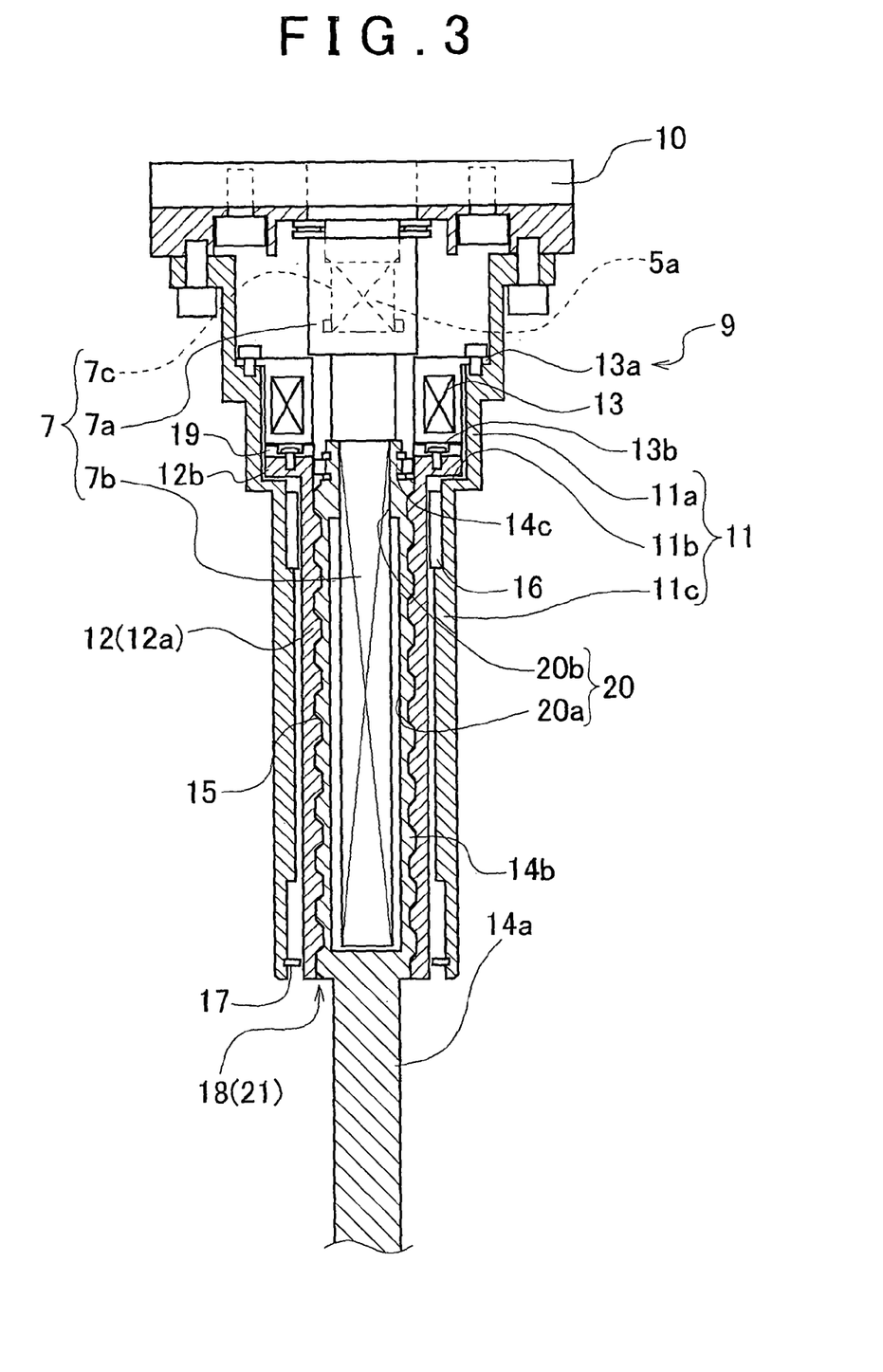
FIG. 3 is a partial cross-sectional side view showing a socket vertically moving section included in the nut runner.

As shown in FIG. 3, the extension bar 7 is coupled to the main shaft 5*a* of the motor 5 for transmitting the rotation of the motor 5 to the spindle 14 which will be described later and for connecting the motor 5 and the spindle 14 in a manner capable of forward-backward motion in the rotational direction. The extension bar 7 is formed of a stepped cylindrical base portion 7*a* and a bar main body 7*b* having a rectangular cross section and a rod shape and extending from one end of the base portion 7*a*. A rectangular coupling recess 7*c* to be coupled to the main shaft 5*a* of the motor 5 is formed at an outer end of the base portion 7*a* of the extension bar 7. The base portion 7*a* of the extension bar 7 is coupled to the main shaft 5*a* of the motor 5 via the coupling recess 7*c* such that the base portion 7*a* is capable of rotation integrally with the main shaft 5*a*, and the bar main body 7*b* is inserted in an insertion hole 20 (insertion hole 20*a* and slide hole 20*b*) that the spindle 14 has. Further, the bar main body 7*b* is fitted to and supported by the slide hole 20*b* of the spindle 14 such that the bar main body 7*b* is slidable in the rotational axis direction and rotatable integrally with the spindle 14. As described above, when the main shaft 5*a* of the motor 5 rotates, the extension bar 7 coupled to the main shaft 5*a* and the spindle 14 fitted to and supported by the bar main body 7*b* of the extension bar 7 rotate. The extension bar 7 extends the length of the output shaft of the motor 5 by a prescribed length in the rotational axis direction. The extension bar 7 enables the variable length of the output shaft and transmission of the rotational driving force of the motor 5 to the spindle 14. The extension bar 7 in accordance with this embodiment has the rectangular cross section. However, the shape thereof is not limited to this, but the cross section may have any shape such that the extension bar 7 is fitted to the spindle 14 and they can integrally rotate.

The socket 8 is engageable in a bolt or a nut. Its base end side is detachably fixed to a tip of the spindle 14, and a tip side of the socket 8 includes an engagement recess 8*a* which is engageable in a bolt or a nut. The socket 8 rotates in a state where the engagement recess 8*a* is engaged in the head of a bolt, thereby allowing tightening of the bolt onto the workpiece W. The socket 8 is detachable from the spindle 14 and is appropriately replaceable with other sockets corresponding to types of bolts or nuts or the like used during fastening the workpiece W.

The socket vertically moving section 9 is for vertically moving the socket with respect to the workpiece W and is mainly configured with an outer case 11, a spindle case 12, an electromagnetic clutch 13, and the spindle 14.

The outer case 11 is a casing member for housing the spindle 14. As shown in FIG. 3, the outer case 11 is in a stepped cylindrical shape and is a cylindrical casing member formed of a large diameter portion 11*a* and a small diameter portion 11*c*. A stepped wall surface 11*b* along the radial direction is provided between the large diameter portion 11*a* and the small diameter portion 11*c*. The electromagnetic clutch 13 is arranged on and fixed to the large diameter portion 11*a*, while the spindle case 12 is inserted in the small diameter portion 11*c*. The outer case 11 is mounted on the base plate 10 via a mount member such that the center axis of the outer case 11 is in the same direction as the rotational axis direction which is the center axis of the main shaft 5*a* of the motor 5.

The spindle case 12 is a casing member which is capable of housing the spindle 14 and helically spline-engages with the spindle 14 in the rotational axis direction. The spindle case 12 is configured relatively rotatable to the spindle 14 around the rotational axis. The spindle case 12 relatively rotates to the spindle 14, and the spindle case 12 thereby moves forward or backward in the rotational axis direction relatively to the spindle 14. The spindle case 12 is a generally cylindrical metal member (formed of aluminum in this embodiment) in which a through hole 15 is formed in the rotational axis direction, and, as shown in FIG. 3, has a cylindrical cylinder 12*a* and a flange 12*b* which protrudes outward in the radial direction at one end of the cylinder 12*a*. The spindle case 12 is formed such that the outer diameter of the cylinder 12*a* is smaller than the inner diameter of the small diameter portion 11*c* of the outer case 11 and such that the outer diameter of the flange 12*b* is larger than the inner diameter of the small diameter portion 11*c* of the outer case 11 and is smaller than the inner diameter of the large diameter portion 11*a*. In the spindle case 12, the cylinder 12*a* is inserted in the smaller diameter portion 11*c* of the outer case 11, and one side of the flange 12*b* faces the stepped wall surface 11*b*. In other words, the flange 12*b* of the spindle case 12 serves as a locking portion for locking the spindle case 12 on the stepped wall surface 11b such that the spindle case 12 does not protrude from the outer case 11 in the state where the cylinder 12a of the spindle case 12 is housed in the small diameter portion 11c of the outer case 11. The cylinder 12a of the spindle case 12 is inserted in annular guide bushes 16 and 17 provided on both sides in the large diameter portion 11a of the outer case 11. The guide bushes 16 and 17 prevent axial strain of the spindle case 12.

An inner peripheral surface of the through hole 15 of the spindle case 12 has a spline engagement portion 18 (see FIG. 4B) in which a helical spline (thread groove) is formed along the rotational axis direction. In other words, the helical thread groove is provided on the inner peripheral surface of the through hole 15 of the spindle case 12, and the spindle case 12 is formed as a so-called "internal thread". Further, at one outer end of the flange 12b of the spindle case 12, an annular joint 19 is mounted by bolts while facing the electromagnetic clutch 13. The joint 19 is configured with a member capable of magnetic holding and can be formed of gray iron (FC) or the like, for example. In this embodiment, the flange 12b is provided at one end of the spindle case 12, as the locking portion for locking the spindle case 12 on the stepped wall surface 11b such that the spindle case 12 does not protrude from the outer case 11. However, the present invention is not limited to this. Bolts are mounted on an intermediate portion in the longitudinal direction of the small diameter portion 11c of the outer case 11 such that the bolts protrude inside the outer case, the tips of the bolts press an outer peripheral surface of the spindle case 12, and the spindle case 12 may be thereby fixed thereto. Further, in this embodiment, the spindle case 12 is formed of aluminum, and the joint 19 is formed of FC. However, the present invention is not limited to these. For example, if a member which is magnetically held is used as the member forming the spindle case 12, the joint 19 and the bolts or the like for fixing the joint 19 are not required.

The electromagnetic clutch 13 is in a cylindrical shape having a through hole at its center. The electromagnetic clutch 13 is integrally mounted inside the large diameter portion 11a of the outer case 11 such that a flange 13a formed at an end of the electromagnetic clutch 13 is fastened to an inner wall of the outer case 11 with bolts in a state where the extension bar 7 is inserted in the through hole. The other end of the electromagnetic clutch 13 has a joint surface 13b which is capable of electromagnetically jointing to the joint 19 of the spindle case 12. The flange 12b of the spindle case 12 which has the joint 19 at the one end is rotatably arranged between the stepped wall surface 11b of the outer case 11 and the joint surface 13b of the electromagnetic clutch 13. The interval between the stepped wall surface 11b of the outer case 11 and the joint surface 13b of the electromagnetic clutch 13 is set slightly larger than the thickness in the rotational axis direction of the flange 12b which has the joint 19. The electromagnetic clutch 13 provides or stops providing the electromagnetic force from the joint surface 13b according to whether electrically connected or disconnected. The joint 19 is held to or separated from the joint surface 13b of the electromagnetic clutch 13 according to provision or shutoff of this electromagnetic force. In other words, when the electromagnetic clutch is electrically connected (ON), the spindle case 12 is held to the outer case 11 via the electromagnetic clutch 13 and is thereby made incapable of rotating with respect to the outer case 11. When the electromagnetic clutch 13 is electrically disconnected (OFF), the spindle case 12 is separated from the outer case 11 and is thereby made rotatable with respect to the outer case 11. In other words, the electromagnetic clutch 13 serves as a switch for holding or separation between the spindle case 12 and the outer case 11. In this embodiment, the electromagnetic clutch 13 is used as the switch. However, the present invention is not limited to this. The switch may be means which allows switching between holding and separation between the spindle case 12 and the outer case 11. For example, a mechanical clutch mechanism may be used. Further, in this embodiment, electrically connecting (ON) the electromagnetic clutch 13 allows the holding between the spindle case 12 and the outer case 11, and electrically disconnecting (OFF) the electromagnetic clutch 13 allows the separation between the spindle case 12 and the outer case 11. However, the present invention is not limited to this. For example, electrically connecting (ON) the electromagnetic clutch 13 may allow the separation between the spindle case 12 and the outer case 11, and electrically disconnecting (OFF) the electromagnetic clutch 13 may allow the holding between the spindle case 12 and the outer case 11.

The spindle 14 has the socket provided at its tip and is rotated by the motor 5. As shown in FIG. 3, the spindle 14 is configured with a cylindrical spindle front end 14a, a spline portion 14b having a larger diameter than the spindle front end 14a, and a spindle rear end 14c having a smaller diameter than the spline portion 14b. At a tip of the spindle front end 14a, a rectangular coupling protrusion 14d for coupling to the socket 8 is formed. The coupling protrusion 14d is fitted into a recess formed on the base end side of the socket 8, thereby coupling the spindle 14 and the socket 8 for integral rotation. Further, the spline portion 14b and the spindle rear end 14c have the insertion hole 20 in which the extension bar 7 is inserted from the spindle rear end 14c side. The insertion hole 20 is formed in the spline portion 14b and is configured with the insertion hole 20a in which the bar main body 7b of the extension bar 7 can be inserted and the slide hole 20b having a rectangular cross section which the bar main body 7b of the extension bar 7 can be inserted in and is slidable along. The bar main body 7b of the extension bar 7 is inserted in the insertion hole. 20, and the spindle 14 is thereby supported by the bar main body 7b of the extension bar 7 such that the spindle 14 is capable of sliding and forward-backward motion with respect to the bar main body 7b.

A spline engagement portion 21 (see FIG. 4B) in which a helical spline (thread groove) is formed along the rotational axis direction is formed on an outer peripheral surface of the spline portion 14b. In other words, the helical thread groove is provided on the outer peripheral surface of the spline portion 14b, and the spline portion 14b is formed as a so-called "external thread". The spline engagement portion 21 of the spline portion 14b and the spline engagement portion 18 provided in the spindle case 12 engage with each other to make spline engagement. In other words, the spline engagement portion 21 of the spline portion 14b serves as the "external thread", and, the spline engagement portion 18 provided in the spindle case 12 serves as the "internal thread", thereby screwing onto each other. When the spindle case 12 (internal thread) is fixed and the spindle 14 (external thread) is rotated, the spindle 14 becomes capable of forward-backward motion in the spindle case 12 in the rotational axis direction. For example, when the spindle case 12 (internal thread) is fixed and the spindle 14 (external thread) is rotated clockwise, the spindle 14 moves down (forward). On the other hand, when the spindle 14 (external thread) is rotated counterclockwise, the spindle 14 moves up (backward).

The control section controls each motion (vertical motion of the spindle 14, ON/OFF of the electromagnetic clutch, drive/stop of the motor 5, and the like) of the tightening system 30 and each motion of the Cartesian coordinate robots 3, 4, and the like. For example, a personal computer or the like can be used as the control section. Further, the control section has a control program for controlling motion of the tightening system 30, the Cartesian coordinate robots 3, and 4, and the like. The control section executes the control program with prescribed preset motion parameters, thereby allowing the tightening system 30, the Cartesian coordinate robots 3 and 4, and the like to perform prescribed motion.

The socket vertically moving section 9 vertically moves the spindle 14 by making the motor 5 drive/stop and by tuning the electromagnetic clutch 13 ON/OFF. In other words, in the state where the electromagnetic clutch 13 is activated (electrically connected), the spindle case 12 is held to the outer case 11. Accordingly, when the motor 5 is driven to rotate the main shaft 5a, because of the spline engagement between the spline engagement portion 21 of the spline portion 14b and the spline engagement portion 18 provided in the spindle case 12, the spindle 14 becomes capable of forward-backward motion with respect to the spindle case 12. As in this embodiment, in the case that the tightening system 30 has the nut runner 2 suspended down therefrom, the socket 8 provided at the tip of the spindle 14 is capable of vertical motion. In this embodiment, the description is made about an example where the socket 8 performs vertical motion. However, the present invention is not limited to this. In other words, a configuration is acceptable in which the spindle 14 having the socket 8 performs forward-backward motion in a prescribed direction. For example, the socket 8 may perform forward-backward motion in the horizontal direction. The present invention is not limited to the vertical motion in which the socket 8 vertically moves as in this embodiment.

Figure 4A:
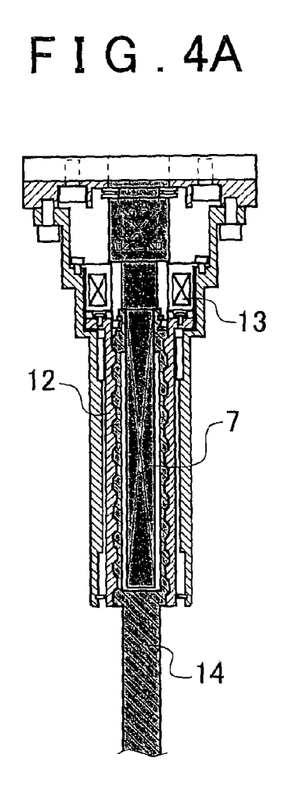
Figure 4B:
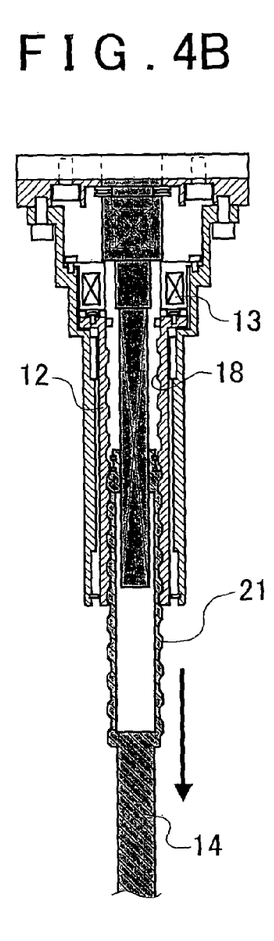
Figure 4C:
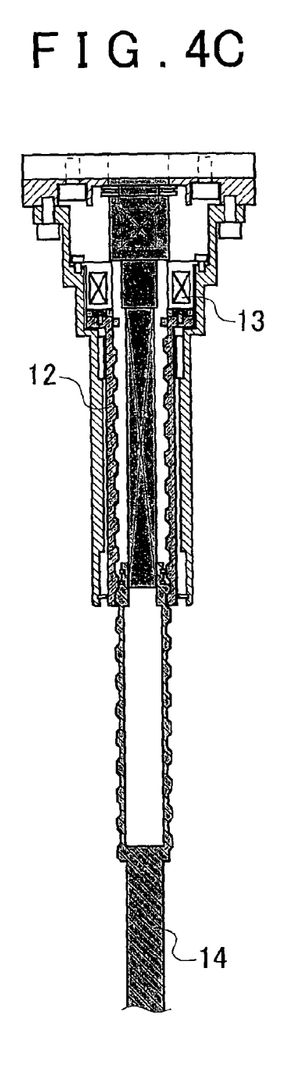

Next, a step of tightening the fastening member onto the workpiece W by the tightening system 30 configured as described above will be described with reference to FIGS. 4A to 4C. As a specific example, a step will be described in which, in an assembly line of automobile engines, the tightening system 30 is arranged above in the assembly line, and the tightening system 30 is used to tighten bolts for fastening a cylinder block and a cylinder head as workpieces W. In FIGS. 4A to 4C, the colored portions indicate the portions which rotate.

In the assembly line of the automobile engines, until the cylinder block and the cylinder head as a pair of workpieces W are transferred on the assembly line, the tightening system 30 is in a standby state and holds the spindle 14 (socket 8) in an upper end position which will be described later.

FIG. 4A shows a state where the spindle 14 is held in the upper end position of the spindle 14 (electromagnetic clutch 13: ON, motor 5: OFF). Here, "the upper end position of the spindle 14" is the position in which the bar main body 7b of the extension bar 7 is completely housed in the insertion hole 20 of the spindle 14 and the spindle 14 has moved up to the highest position. In such a state where the spindle 14 is held in the upper end position of the spindle 14, the electromagnetic clutch 13 is ON (electrically connected), and the motor 5 is OFF (stopped). When the electromagnetic clutch 13 is electrically connected, the joint surface 13b of the electromagnetic clutch 13 produces electromagnetic force, and the joint 19 mounted on the spindle case 12 is attracted and held onto the joint surface 13b. Accordingly, the spindle case 12 is integrally held to the outer case 11 via the electromagnetic clutch 13. When the workpieces W are transferred to a prescribed position below the tightening system 30, the control system controls the tightening system 30 and starts tightening operation of the fastening members onto the workpieces W. A control method will be described below by which the control section moves down the spindle 14 (socket 8) to the first bolt tightening position on the workpieces W.

FIG. 4B shows a state where the spindle 14 is moving down in an intermediate position between the upper end position and the lower end position of the spindle 14 (electromagnetic clutch 13: ON, motor 5: ON). In such a state where the spindle 14 is moving down in an intermediate position, the electromagnetic clutch 13 is ON (electrically connected), and the motor 5 is ON (driven). When the electromagnetic clutch 13 is electrically connected, the joint surface 13b of the electromagnetic clutch 13 produces electromagnetic force, and the joint 19 mounted on the spindle case 12 is attracted and held onto the joint surface 13b. Accordingly, the spindle case 12 is integrally held to the outer case 11 via the electromagnetic clutch 13. In such a state where the spindle case 12 is integrally held to the outer case 11, when the motor 5 is driven, the clockwise rotation of the motor 5 causes the spindle 14 which is spline-engaged with the spindle case 12 to slide while rotating with respect to the extension bar 7. The rotating spindle 14 moves in the rotational axis direction in the spindle case 12. In other words, the spindle 14 moves down toward the first bolt tightening position on the workpieces W. A control method will be described below by which the control section has moved down the spindle 14 (socket 8) to the first bolt tightening position on the workpieces W and thereafter tightens the fastening member on the workpieces W.

FIG. 4C shows a state where the spindle 14 is held in the lower end position of the spindle 14 (electromagnetic clutch 13: OFF). Here, "the lower end position of the spindle 14" is the position in which the spindle 14 slides with respect to the bar main body 7b of the extension bar 7, a tip of the bar main body 7b of: the extension bar 7 is positioned in the insertion hole 20 (slide hole 20b) of the spindle 14, that is, the spindle 14 has moved down to the lowest position. In such a state where the spindle 14 is held in the lower end position of the spindle 14, the spindle 14 has further moved down from the intermediate position and has reached the lower end position of the spindle 14. In the lower end position of the spindle 14, the fastening member (a bolt or a nut in this embodiment) is tightened. In other words, when the spindle 14 reaches the lower end position, the head of a bolt is engaged in the engagement recess 8a of the socket 8 mounted on the tip of the spindle 14. The control section turns OFF (electrically disconnects) the electromagnetic clutch 13 and stops the production of electromagnetic force on the joint surface 13b of the electromagnetic clutch 13. Accordingly, the spindle case 12 held to the electromagnetic clutch 13 via the joint 19 is separated from the electromagnetic clutch 13. This allows the spindle case 12 to be rotatable independently from the outer case 11. The spline engagement portion 21 of the spindle 14 and the spline engagement portion 18 of the spindle case 12 are spline-engaged together, and the spindle case 12 thereby rotates together with the spindle 14, in other words, the spindle case 12 and the spindle 14 can corotate around the rotational axis in the outer case 11. Accordingly, the rotation of the motor 5 is transmitted to the spindle 14 and the socket 8 mounted on the spindle 14, thereby allowing tightening of the bolt engaged in the socket 8 in the lower end position of the spindle 14.

After the tightening of the first bolt is complete, the control section again turns ON (electrically connects) the electromagnetic clutch 13 and thereby integrally holds the spindle case 12 to the outer case 11, causes the motor 5 to rotate counterclockwise, and moves up the socket 8 and the spindle 14. The spindle 14 returns to the upper end position. After the tightening of the bolt in the first bolt tightening position on the workpieces W is complete, the control section operates the Cartesian coordinate robots 3 and 4 and thereby moves the nut runner 2 to a preset next bolt tightening position, and continues tightening the next bolt in the same manner as described above. In the tightening system 30 in accordance with this embodiment, the single nut runner 2 is moved by the Cartesian coordinate robots 3 and 4, thereby allowing tightening of the fastening members in a plurality of positions.

As described above, when the tightening system 30 of this embodiment electrically connects the electromagnetic clutch 13 and thereby holds the spindle case 12 to the outer case 11, and when the spindle 14 is rotated by the drive of the motor 5, the spindle 14 is capable of forward-backward motion with respect to the spindle case 12. Further, when the electromagnetic clutch 13 is electrically disconnected to separate the spindle case 12 from the outer case 11, and when the spindle 14 is rotated by the drive of the motor 5, the spindle case 12 and the spindle 14 corotate, and driving force can be thereby transmitted only in the rotational direction. Therefore, the fastening member engaged in the socket 8 can be tightened.

Further, conventional tightening systems have been known that include a nut runner unit having a plurality of nut runners (a so-called multi-axis nut runner) for tightening a plurality of fastening members on a workpiece W. However, such conventional tightening systems vertically move the whole multi-axis nut runner unit and tighten the fastening members. Since the multi-axis nut runner unit has a large weight, the tightening system requires a vertically moving actuator (such as an air cylinder) with high performance for vertically moving such a large weight article and thus becomes large in size. On the other hand, the tightening system 30 of this embodiment has the single nut runner 2 mounted on the two-axis Cartesian coordinate robot (Cartesian coordinate robots 3 and 4), tightens the plurality of fastening members one by one on the workpiece W having a plurality tightening spots by following the control program provided to the control section, and vertically moves only the spindle 14 having the single socket 8. Therefore, the tightening system 30 of this embodiment is highly versatile compared to the conventional tightening systems including a multi-axis nut runner unit and allows reduction in weight and size. Further, the tightening system 30 of this embodiment vertically moves only the spindle 14 having the socket 8, thus allowing tightening on the plurality of spots in a minimum displacement during moving up or down in the range where the tightening system does not interfere with the workpiece W. The tightening system 30 of this embodiment has a compact system configuration and allows efficient tightening. In other words, the tightening system 30 of this embodiment has a high degree of freedom in motion compared to the conventional tightening systems including a multi-axis nut runner unit and thus is a flexible tightening system. The tightening system 30 of this embodiment requires no air cylinder as in the conventional tightening systems, thus requires no air supply apparatus for the air cylinder, and allows reduction in required space, simplification of the system, and reduction in size. The tightening system 30 of this embodiment can guide the socket 8 to a desired tightening spot for the fastening member on the workpiece W by vertical motion of the spindle 14, thus can guide the socket 8 to a tightening spot such as a narrow spot and an inside of a hole, and can perform tightening. Further, the socket vertically moving section 9 included in the tightening system 30 is different from conventional socket vertically moving means using an air cylinder. The tightening system 30 facilitates holding of the socket in the intermediate position described above. This expands the motion range of the vertical motion of the socket and allows further efficient tightening.

As described in the foregoing, the tightening system 30 of this embodiment is capable of forward-backward motion of the spindle by use of the rotation of the driving section and thus allows a compact system configuration.

In the tightening system 30 of this embodiment, a moving system for making the tightening system 30 moveable to a prescribed position may be provided above the nut runner variably positioning system 1. As an example of such a moving system, the tightening system 30 may be a system which moves along the workpieces W transferred on the automobile assembly line. Accordingly, the tightening system 30 may be provided with a moving mechanism using a rail and a pulley.

The invention claimed is:

1. A tightening system for tightening a fastening member, the system comprising:
   a driving section which produces torque for tightening the fastening member;
   an extension bar which is coupled to the driving section and rotated by the torque;
   a spindle to which the torque is transmitted via the extension bar and which is connected to the extension bar such that the spindle moves forward or backward in a rotational axis direction of the extension bar with respect to the extension bar;
   a socket which is provided at a tip of the spindle and engages in the fastening member;
   a spindle case which houses the spindle and makes helical spline engagement with the spindle along a rotational axis direction of the spindle;
   an outer case which houses the spindle case; and
   a switch for switching between a state where the spindle case is held to the outer case and a state where the spindle case is separated from the outer case,
   wherein the switch is an electromagnetic clutch which is integrally mounted in the outer case,
   i) when the electromagnetic clutch is electrically connected, the spindle case is held to the outer case, and when the spindle is rotated by drive of the driving section, the spindle moves forward or backward with respect to the spindle case,
   ii) when the electromagnetic clutch is electrically disconnected, the spindle case separates from the outer case, and when the spindle is rotated by the drive of the driving section, the spindle case corotates with the spindle and the fastening member which is engaged in the socket is tightened.

* * * * *